United States Patent
Lo et al.

(10) Patent No.: US 11,080,902 B2
(45) Date of Patent: Aug. 3, 2021

(54) SYSTEMS AND METHODS FOR GENERATING ANATOMICAL TREE STRUCTURES

(71) Applicant: INTUITIVE SURGICAL OPERATIONS, INC., Sunnyvale, CA (US)

(72) Inventors: Pechin Chien Pau Lo, Santa Clara, CA (US); Jun Ma, Santa Clara, CA (US); Tao Zhao, Sunnyvale, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 59 days.

(21) Appl. No.: 16/528,493

(22) Filed: Jul. 31, 2019

(65) Prior Publication Data
US 2020/0043207 A1 Feb. 6, 2020

Related U.S. Application Data

(60) Provisional application No. 62/714,304, filed on Aug. 3, 2018.

(51) Int. Cl.
*G06T 11/20* (2006.01)
*G06T 7/11* (2017.01)
*G06T 7/143* (2017.01)

(52) U.S. Cl.
CPC ............. *G06T 11/203* (2013.01); *G06T 7/11* (2017.01); *G06T 7/143* (2017.01);
(Continued)

(58) Field of Classification Search
None
See application file for complete search history.

(56) References Cited

U.S. PATENT DOCUMENTS 6,380,732 B1 4/2002 Gilboa
6,389,187 B1 5/2002 Greenaway et al.
(Continued)

FOREIGN PATENT DOCUMENTS

WO WO-2016191298 A1 12/2016

OTHER PUBLICATIONS

Bauer C., et al., "Airway Tree Reconstruction Based on Tube Detection," Proceedings of MICCAI, 2009, pp. 203-214.
(Continued)

*Primary Examiner* — David H Chu
(74) *Attorney, Agent, or Firm* — Haynes and Boone, LLP

(57) ABSTRACT

A method of building an anatomical branch model comprises receiving anatomical image data comprising a plurality of graphical units associated with an anatomical structure and determining a plurality of parent segments and child segments. The method also comprises determining a set of relationships between the parent segments and the child segments by determining a first set of connection costs of connecting at least one of the parent segments to a first subset of the child segments, the child segments of the first subset are separated from the at least one of the parent segments by one or more gaps, identifying a first child segment from the first subset of the child segments based on a first connection cost, and connecting the first child segment to the at least one parent segment. The method further comprising generating an image of the anatomical branch model based on the determined set of relationships.

20 Claims, 12 Drawing Sheets

(52) U.S. Cl.
CPC ............... *G06T 2207/20076* (2013.01); *G06T 2207/30061* (2013.01); *G06T 2210/41* (2013.01)

(56) References Cited

U.S. PATENT DOCUMENTS

| | | | |
|---|---|---|---|
| 7,316,681 B2 | 1/2008 | Madhani et al. | |
| 7,772,541 B2 | 8/2010 | Froggatt et al. | |
| 9,138,147 B2* | 9/2015 | Schmitt | A61B 5/6852 |
| 9,259,274 B2 | 2/2016 | Prisco | |
| 9,452,276 B2 | 9/2016 | Duindam et al. | |
| 2002/0090121 A1* | 7/2002 | Schneider | G06T 7/187 |
| | | | 382/128 |
| 2005/0240094 A1* | 10/2005 | Pichon | G06T 7/11 |
| | | | 600/407 |
| 2006/0013523 A1 | 1/2006 | Childlers et al. | |
| 2006/0257031 A1* | 11/2006 | Abramoff | G06T 7/0012 |
| | | | 382/224 |
| 2007/0165917 A1* | 7/2007 | Cao | G06T 7/0012 |
| | | | 382/128 |
| 2008/0044072 A1* | 2/2008 | Kiraly | G06T 7/11 |
| | | | 382/128 |
| 2008/0077875 A1* | 3/2008 | Li | G06T 11/206 |
| | | | 715/764 |
| 2009/0185731 A1* | 7/2009 | Ray | G06T 7/12 |
| | | | 382/131 |
| 2012/0081362 A1* | 4/2012 | Kiraly | A61B 6/5241 |
| | | | 345/419 |
| 2012/0249546 A1* | 10/2012 | Tschirren | G06T 19/00 |
| | | | 345/419 |
| 2014/0275952 A1* | 9/2014 | Monroe | G06T 19/00 |
| | | | 600/407 |
| 2014/0355858 A1* | 12/2014 | O'Dell | G06T 7/11 |
| | | | 382/131 |
| 2016/0117814 A1* | 4/2016 | Kim | G06K 9/4604 |
| | | | 382/128 |
| 2019/0139227 A1* | 5/2019 | Wang | G06T 7/187 |
| 2020/0242776 A1* | 7/2020 | Nagata | G06T 7/162 |

OTHER PUBLICATIONS

Inoue T., et al., "Robust Airway Extraction based on Machine Learning and Minimum Spanning Tree," SPIE Medical Imaging, Feb. 2013, vol. 8670, 4 pages.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

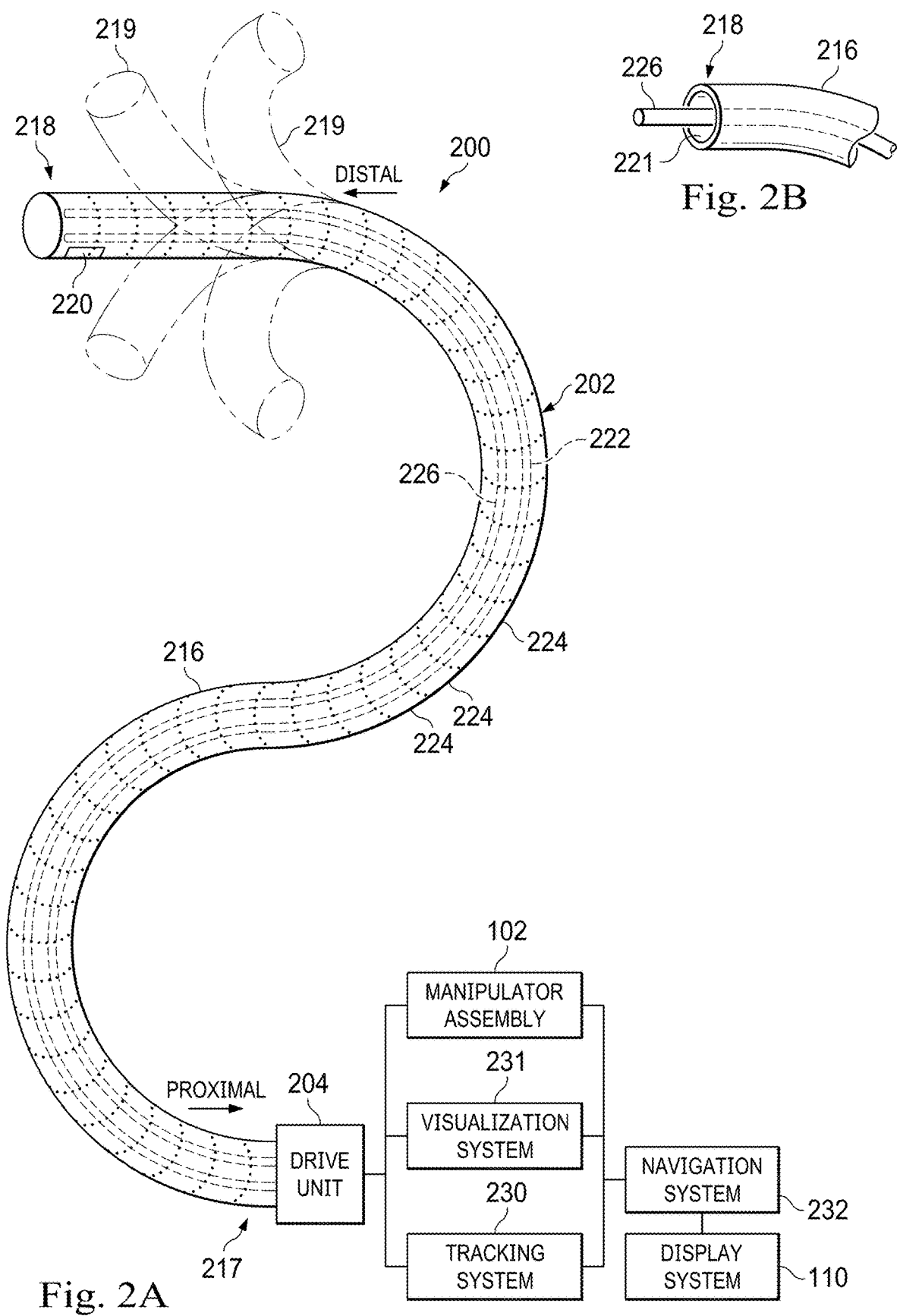

SYSTEMS AND METHODS FOR GENERATING ANATOMICAL TREE STRUCTURES

CROSS-REFERENCE TO RELATED APPLICATIONS

This application claims the benefit of U.S. Provisional Application 62/714,304 filed Aug. 3, 2018, which is incorporated by reference herein in its entirety.

FIELD

The present disclosure is directed to systems and methods for generating anatomical tree structures.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions an operator may insert minimally invasive medical instruments (including surgical, diagnostic, therapeutic, or biopsy instruments) to reach a target tissue location. One such minimally invasive technique is to use a flexible and/or steerable elongate device, such as a flexible catheter, that can be inserted into anatomic passageways and navigated toward a region of interest within the patient anatomy. Navigation may be assisted through the use of images of the anatomic passageways. Improved systems and techniques are needed to accurately perform image segmentation and to accurately generate anatomical tree structures that correspond to the patient's anatomic passageways.

SUMMARY

The embodiments of the invention are best summarized by the claims that follow the description.

Consistent with some embodiments, a method of building an anatomical branch model comprises receiving anatomical image data comprising a plurality of graphical units associated with an anatomical structure and determining a plurality of parent segments and child segments to include a plurality of linked graphical units from the plurality of graphical units of the anatomical image data. The method also comprises determining a set of relationships between the parent segments and the child segments; including determining, for at least one of the parent segments; a first set of connection costs of connecting the at least one parent segment to a first subset of the child segments; identifying a first child segment from the first subset of the child segments based on the first set of connection costs; and connecting the first child segment to the at least one parent segment to form a segment section. The method also comprises generating an image of the anatomical branch model based on the determined set of relationships between the parent segments and the child segments, including the segment section connecting the first child segment and the at least one parent segment.

Consistent with some embodiments, a system for building an anatomical branch model comprises a display system and a control system communicatively coupled to the display system. The control system is configured to receive anatomical image data comprising a plurality of graphical units associated with an anatomical structure and determine a plurality of parent segments and child segments to include a plurality of linked graphical units from the plurality of graphical units of the anatomical image data. The control system is also configured to determine a set of relationships between the parent segments and the child segments, including determining, for at least one of the parent segments, a first set of connection costs of connecting the at least one parent segment to a first subset of the child segments; identifying a first child segment from the first subset of the child segments based on the first set of connection costs; and connecting the first child segment to the at least one parent segment to form a segment section; The control system is also configured to generate an image of the anatomical branch model for display on the display system. The generation of the image is based on the determined set of relationships between the parent segments and the child segments, including the segment section connecting the first child segment and the at least one parent segment.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

FIG. 2A is a simplified diagram of a medical instrument system according to some embodiments.

FIG. 2B is a simplified diagram of a medical instrument with an extended medical tool according to some embodiments.

Figure 1:
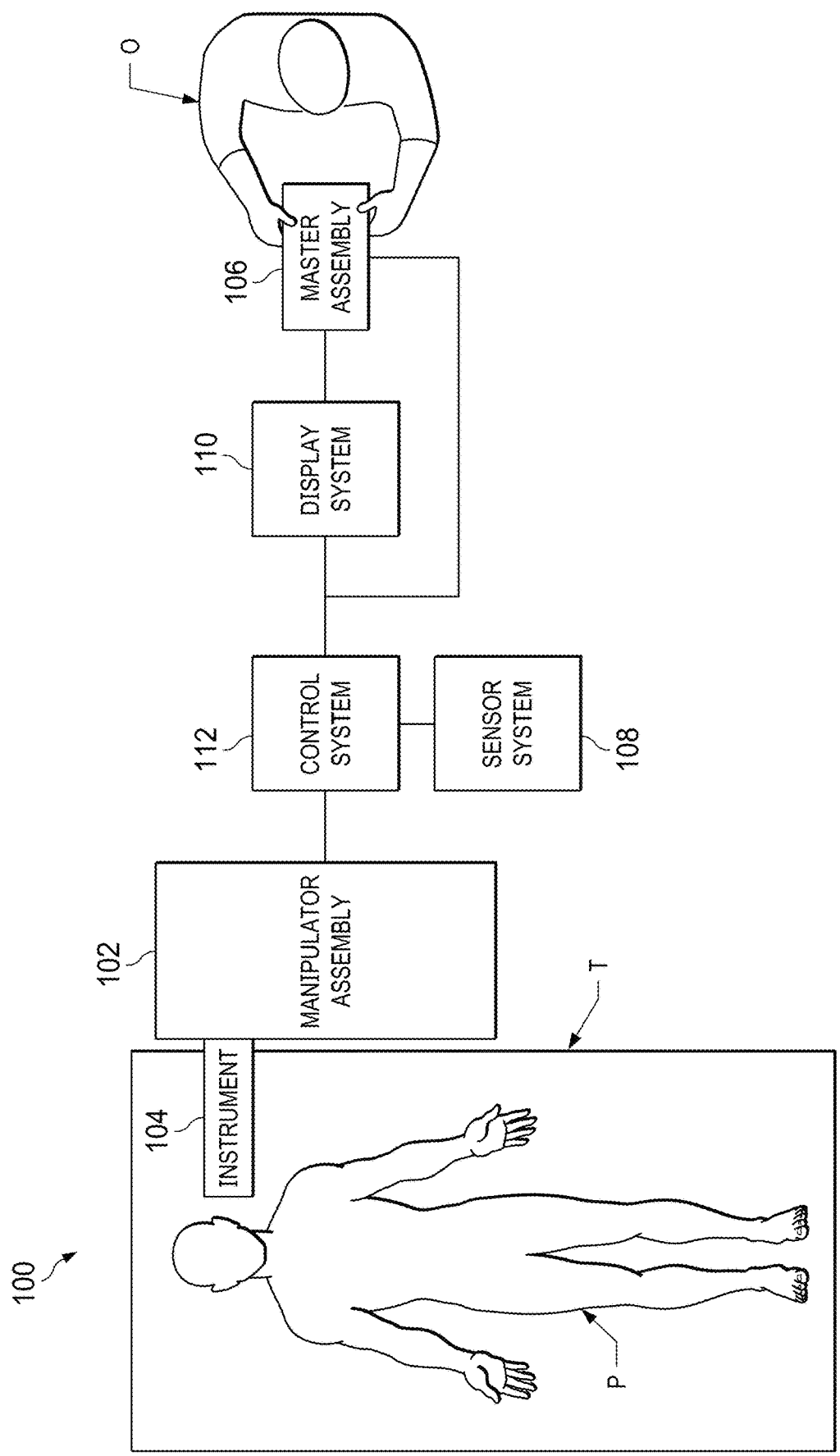
FIG. 1 is a simplified diagram of a robotic or teleoperated medical system according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some instances well known methods, procedures, components, and circuits have not been described in detail so as not to unnecessarily obscure aspects of the embodiments.

This disclosure describes various instruments and portions of instruments in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

FIG. 1 is a simplified diagram of a robotic and/or teleoperated medical system 100 according to some embodiments. In some embodiments, medical system 100 may be suitable for use in, for example, surgical, diagnostic, therapeutic, or biopsy procedures. While some embodiments are provided herein with respect to such procedures, any reference to medical or surgical instruments and medical or surgical methods is non-limiting. The systems, instruments, and methods described herein may be used for animals, human cadavers, animal cadavers, portions of human or animal anatomy, non-surgical diagnosis, as well as for industrial systems and general robotic, general teleoperational, or robotic medical systems.

As shown in FIG. 1, medical system 100 generally includes a manipulator assembly 102 for operating a medical instrument 104 in performing various procedures on a patient P. The manipulator assembly 102 may be teleoperated, non-teleoperated, or a hybrid teleoperated and non-teleoperated assembly with select degrees of freedom of motion that may be motorized and/or teleoperated and select degrees of freedom of motion that may be non-motorized and/or non-teleoperated. Manipulator assembly 102 is mounted to or near an operating table T. A master assembly 106 allows an operator (e.g., a surgeon, a clinician, or a physician as illustrated in FIG. 1) to view the interventional site and to control manipulator assembly 102.

Master assembly 106 may be located at an operator console which is usually located in the same room as operating table T, such as at the side of a surgical table on which patient P is located. However, it should be understood that operator O can be located in a different room or a completely different building from patient P. Master assembly 106 generally includes one or more control devices for controlling manipulator assembly 102. The control devices may include any number of a variety of input devices, such as joysticks, trackballs, data gloves, trigger-guns, hand-operated controllers, voice recognition devices, body motion or presence sensors, and/or the like. To provide operator O a strong sense of directly controlling instruments 104 the control devices may be provided with the same degrees of freedom as the associated medical instrument 104. In this manner, the control devices provide operator O with telepresence or the perception that the control devices are integral with medical instruments 104.

In some embodiments, the control devices may have more or fewer degrees of freedom than the associated medical instrument 104 and still provide operator O with telepresence. In some embodiments, the control devices may optionally be manual input devices which move with six degrees of freedom, and which may also include an actuatable handle for actuating instruments (for example, for closing grasping jaws, applying an electrical potential to an electrode, delivering a medicinal treatment, and/or the like).

Manipulator assembly 102 supports medical instrument 104 and may include a kinematic structure of one or more non-servo controlled links (e.g., one or more links that may be manually positioned and locked in place, generally referred to as a set-up structure), and/or one or more servo controlled links (e.g. one more links that may be controlled in response to commands from the control system), and a manipulator. Manipulator assembly 102 may optionally include a plurality of actuators or motors that drive inputs on medical instrument 104 in response to commands from the control system (e.g., a control system 112). The actuators may optionally include drive systems that when coupled to medical instrument 104 may advance medical instrument 104 into a naturally or surgically created anatomic orifice. Other drive systems may move the distal end of medical instrument 104 in multiple degrees of freedom, which may include three degrees of linear motion (e.g., linear motion along the X, Y, Z Cartesian axes) and in three degrees of rotational motion (e.g., rotation about the X, Y, Z Cartesian axes). Additionally, the actuators can be used to actuate an articulable end effector of medical instrument 104 for grasping tissue in the jaws of a biopsy device and/or the like. Actuator position sensors such as resolvers, encoders, potentiometers, and other mechanisms may provide sensor data to medical system 100 describing the rotation and orientation of the motor shafts. This position sensor data may be used to determine motion of the objects manipulated by the actuators.

Medical system 100 may include a sensor system 108 with one or more sub-systems for receiving information about the instruments of manipulator assembly 102. Such sub-systems may include a position/location sensor system (e.g., an electromagnetic (EM) sensor system); a shape sensor system for determining the position, orientation, speed, velocity, pose, and/or shape of a distal end and/or of one or more segments along a flexible body that may make up medical instrument 104; and/or a visualization system for capturing images from the distal end of medical instrument 104.

Medical system 100 also includes a display system 110 for displaying an image or representation of the surgical site and medical instrument 104 generated by sub-systems of sensor system 108. Display system 110 and master assembly 106 may be oriented so operator O can control medical instrument 104 and master assembly 106 with the perception of telepresence.

In some embodiments, medical instrument 104 may have a visualization system (discussed in more detail below), which may include a viewing scope assembly that records a concurrent or real-time image of a surgical site and provides the image to the operator or operator O through one or more displays of medical system 100, such as one or more displays of display system 110. The concurrent image may be, for example, a two or three dimensional image captured by an endoscope positioned within the surgical site. In some embodiments, the visualization system includes endoscopic components that may be integrally or removably coupled to medical instrument 104. However in some embodiments, a separate endoscope, attached to a separate manipulator assembly may be used with medical instrument 104 to image the surgical site. The visualization system may be implemented as hardware, firmware, software or a combination thereof which interact with or are otherwise executed by one or more computer processors, which may include the processors of a control system 112.

Display system 110 may also display an image of the surgical site and medical instruments captured by the visualization system. In some examples, medical system 100 may configure medical instrument 104 and controls of master assembly 106 such that the relative positions of the medical instruments are similar to the relative positions of the eyes and hands of operator O. In this manner operator O can manipulate medical instrument 104 and the hand control as if viewing the workspace in substantially true presence. By true presence, it is meant that the presentation of an image is a true perspective image simulating the viewpoint of a physician that is physically manipulating medical instrument 104.

In some examples, display system 110 may present images of a surgical site recorded pre-operatively or intra-operatively using image data from imaging technology such as, computed tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. The pre-operative or intra-operative image data may be presented as two-dimensional, three-dimensional, or four-dimensional (including e.g., time based or velocity based information) images and/or as images from models created from the pre-operative or intra-operative image data sets.

In some embodiments, often for purposes of image-guided medical procedures, display system 110 may display a virtual navigational image in which the actual location of medical instrument 104 is registered (i.e., dynamically referenced) with the preoperative or concurrent images/model. This may be done to present the operator O with a virtual image of the internal surgical site from a viewpoint of medical instrument 104. In some examples, the viewpoint may be from a tip of medical instrument 104. An image of the tip of medical instrument 104 and/or other graphical or alphanumeric indicators may be superimposed on the virtual image to assist operator O controlling medical instrument 104. In some examples, medical instrument 104 may not be visible in the virtual image.

In some embodiments, display system 110 may display a virtual navigational image in which the actual location of medical instrument 104 is registered with preoperative or concurrent images to present the operator O with a virtual image of medical instrument 104 within the surgical site from an external viewpoint. An image of a portion of medical instrument 104 or other graphical or alphanumeric indicators may be superimposed on the virtual image to assist operator O in the control of medical instrument 104. As described herein, visual representations of data points may be rendered to display system 110, For example, measured data points, moved data points, registered data points, and other data points described herein may be displayed on display system 110 in a visual representation. The data points may be visually represented in a user interface by a plurality of points or dots on display system 110 or as a rendered model, such as a mesh or wire model created based on the set of data points. In some examples, the data points may be color coded according to the data they represent. In some embodiments, a visual representation may be refreshed in display system 110 after each processing operation has been implemented to alter data points.

Medical system 100 may also include control system 112. Control system 112 includes at least one memory and at least one computer processor (not shown) for effecting control between medical instrument 104, master assembly 106, sensor system 108, and display system 110. Control system 112 also includes programmed instructions (e.g., a non-transitory machine-readable medium storing the instructions) to implement some or all of the methods described in accordance with aspects disclosed herein, including instructions for providing information to display system 110. While control system 112 is shown as a single block in the simplified schematic of FIG. 1, the system may include two or more data processing circuits with one portion of the processing optionally being performed on or adjacent to manipulator assembly 102, another portion of the processing being performed at master assembly 106, and/or the like. The processors of control system 112 may execute instructions comprising instruction corresponding to processes disclosed herein and described in more detail below. Any of a wide variety of centralized or distributed data processing architectures may be employed. Similarly, the programmed instructions may be implemented as a number of separate programs or subroutines, or they may be integrated into a number of other aspects of the robotic medical systems described herein. In one embodiment, control system 112 supports wireless communication protocols such as Bluetooth, IrDA, HomeRF, IEEE 802.11, DECT, and Wireless Telemetry.

In some embodiments, control system 112 may receive force and/or torque feedback from medical instrument 104. Responsive to the feedback, control system 112 may transmit signals to master assembly 106. In some examples, control system 112 may transmit signals instructing one or more actuators of manipulator assembly 102 to move medical instrument 104. Medical instrument 104 may extend into an internal surgical site within the body of patient P via openings in the body of patient P. Any suitable conventional and/or specialized actuators may be used. In some examples, the one or more actuators may be separate from, or integrated with, manipulator assembly 102. In some embodiments, the one or more actuators and manipulator assembly 102 are provided as part of a teleoperational cart positioned adjacent to patient P and operating table T.

Control system 112 may optionally further include a virtual visualization system to provide navigation assistance to operator O when controlling medical instrument 104 during an image-guided medical procedure. Virtual navigation using the virtual visualization system may be based upon reference to an acquired preoperative or intraoperative dataset of anatomic passageways. The virtual visualization system processes images of the surgical site imaged using imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. Software, which may be used in combination with manual inputs, is used to convert the recorded images into segmented two dimensional or three dimensional composite representation of a partial or an entire anatomic organ or anatomic region. An image data set is associated with the composite representation. The composite representation and the image data set describe the various locations and shapes of the passageways and their connectivity. The images used to generate the composite representation may be recorded preoperatively or intra-operatively during a clinical procedure. In some embodiments, a virtual visualization system may use standard representations (i.e., not patient specific) or hybrids of a standard representation and patient specific data. The composite representation and any virtual images generated by the composite representation may represent the static posture of a deformable anatomic region during one or more phases of motion (e.g., during an inspiration/expiration cycle of a lung).

During a virtual navigation procedure, sensor system 108 may be used to compute an approximate location of medical instrument 104 with respect to the anatomy of patient P. The location can be used to produce both macro-level (external) tracking images of the anatomy of patient P and virtual internal images of the anatomy of patient P. The system may implement one or more electromagnetic (EM) sensor, fiber optic sensors, and/or other sensors to register and display a medical implement together with preoperatively recorded surgical images, such as those from a virtual visualization system. For example, PCT Publication WO 2016/191298 (published Dec. 1, 2016) (disclosing "Systems and Methods of Registration for Image Guided Surgery"), which is incorporated by reference herein in its entirety, discloses such one system. Medical system 100 may further include optional operations and support systems (not shown) such as illumination systems, steering control systems, irrigation systems, and/or suction systems. In some embodiments, medical system 100 may include more than one manipulator assembly and/or more than one master assembly. The exact number of teleoperational manipulator assemblies will depend on the medical procedure and the space constraints within the operating room, among other factors. Master assembly 106 may be collocated or they may be positioned in separate locations. Multiple master assemblies allow more than one operator to control one or more teleoperational manipulator assemblies in various combinations, FIG. 2A is a simplified diagram of a medical instrument system 200 according to some embodiments. In some embodiments, medical instrument system 200 may be used as medical instrument 104 in an image-guided medical procedure performed with medical system 100. In some examples, medical instrument system 200 may be used for non-teleoperational exploratory procedures or in procedures involving traditional manually operated medical instruments, such as endoscopy. Optionally medical instrument system 200 may be used to gather (i.e., measure) a set of data points corresponding to locations within anatomic passageways of a patient, such as patient P.

Medical instrument system 200 includes elongate device 202, such as a flexible catheter, coupled to a drive unit 204. Elongate device 202 includes a flexible body 216 having proximal end 217 and distal end or tip portion 218. In some embodiments, flexible body 216 has an approximately 3 mm outer diameter. Other flexible body outer diameters may be larger or smaller.

Medical instrument system 200 further includes a tracking system 230 for determining the position, orientation, speed, velocity, pose, and/or shape of distal end 218 and/or of one or more segments 224 along flexible body 216 using one or more sensors and/or imaging devices as described in further detail below. The entire length of flexible body 216, between distal end 218 and proximal end 217, may be effectively divided into segments 224. Tracking system 230 may optionally be implemented as hardware, firmware, software or a combination thereof which interact with or are otherwise executed by one or more computer processors, which may include the processors of control system 112 in FIG. 1.

Tracking system 230 may optionally track distal end 218 and/or one or more of the segments 224 using a shape sensor 222. Shape sensor 222 may optionally include an optical fiber aligned with flexible body 216 (e.g., provided within an interior channel (not shown) or mounted externally). In one embodiment, the optical fiber has a diameter of approximately 200 µm. In other embodiments, the dimensions may be larger or smaller. The optical fiber of shape sensor 222 forms a fiber optic bend sensor for determining the shape of flexible body 216. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fibre Bend Sensor"), which are all incorporated by reference herein in their entireties. Sensors in some embodiments may employ other suitable strain sensing techniques, such as Rayleigh scattering, Raman scattering, Brillouin scattering, and Fluorescence scattering. In some embodiments, the shape of the elongate device may be determined using other techniques. For example, a history of the distal end pose of flexible body 216 can be used to reconstruct the shape of flexible body 216 over the interval of time. In some embodiments, tracking system 230 may optionally and/or additionally track distal end 218 using a position sensor system 220. Position sensor system 220 may be a component of an EM sensor system with position sensor system 220 including one or more conductive coils that may be subjected to an externally generated electromagnetic field. Each coil of the EM sensor system then produces an induced electrical signal having characteristics that depend on the position and orientation of the coil relative to the externally generated electromagnetic field. In some embodiments, position sensor system 220 may be configured and positioned to measure six degrees of freedom, e.g., three position coordinates X, Y, Z and three orientation angles indicating pitch, yaw, and roll of a base point or five degrees of freedom, e.g., three position coordinates X, Y, Z and two orientation angles indicating pitch and yaw of a base point. Further description of a position sensor system is provided in U.S. Pat. No. 6,380,732 (filed Aug. 11, 1999) (disclosing "Six-Degree of Freedom Tracking System Having a Passive Transponder on the Object Being Tracked"), which is incorporated by reference herein in its entirety.

In some embodiments, tracking system 230 may alternately and/or additionally rely on historical pose, position, or orientation data stored for a known point of an instrument system along a cycle of alternating motion, such as breathing. This stored data may be used to develop shape information about flexible body 216. In some examples, a series of positional sensors (not shown), such as electromagnetic (EM) sensors similar to the sensors in position sensor 220 may be positioned along flexible body 216 and then used for shape sensing. In some examples, a history of data from one or more of these sensors taken during a procedure may be used to represent the shape of elongate device 202, particularly if an anatomic passageway is generally static.

Flexible body 216 includes a channel 221 sized and shaped to receive a medical instrument 226. FIG. 2B is a simplified diagram of flexible body 216 with medical instrument 226 extended according to some embodiments. In some embodiments, medical instrument 226 may be used for procedures such as surgery, biopsy, ablation, illumination, irrigation, or suction. Medical instrument 226 can be deployed through channel 221 of flexible body 216 and used at a target location within the anatomy. Medical instrument 226 may include, for example, image capture probes, biopsy instruments, laser ablation fibers, and/or other surgical, diagnostic, or therapeutic tools. Medical tools may include end effectors having a single working member such as a scalpel, a blunt blade, an optical fiber, an electrode, and/or the like. Other end effectors may include, for example, forceps, graspers, scissors, clip appliers, and/or the like. Other end effectors may further include electrically activated end effectors such as electrosurgical electrodes, transducers, sensors, and/or the like. In various embodiments, medical instrument 226 is a biopsy instrument, which may be used to remove sample tissue or a sampling of cells from a target anatomic location. Medical instrument 226 may be used with an image capture probe also within flexible body 216. In various embodiments, medical instrument 226 may be an image capture probe that includes a distal portion with a stereoscopic or monoscopic camera at or near distal end 218 of flexible body 216 for capturing images (including video images) that are processed by a visualization system 231 for display and/or provided to tracking system 230 to support tracking of distal end 218 and/or one or more of the segments 224. The image capture probe may include a cable coupled to the camera for transmitting the captured image data. In some examples, the image capture instrument may be a fiber-optic bundle, such as a fiberscope, that couples to visualization system 231. The image capture instrument may be single or multi-spectral, for example capturing image data in one or more of the visible, infrared, and/or ultraviolet spectrums. Alternatively, medical instrument 226 may itself be the image capture probe. Medical instrument 226 may be advanced from the opening of channel 221 to perform the procedure and then retracted back into the channel when the procedure is complete. Medical instrument 226 may be removed from proximal end 217 of flexible body 216 or from another optional instrument port (not shown) along flexible body 216.

Medical instrument 226 may additionally house cables, linkages, or other actuation controls (not shown) that extend between its proximal and distal ends to controllably bend the distal end of medical instrument 226. Steerable instruments are described in detail in U.S. Pat. No. 7,316,681 (filed on Oct. 4, 2005) (disclosing "Articulated Surgical Instrument for Performing Minimally invasive Surgery with Enhanced Dexterity and Sensitivity") and U.S. patent application Ser. No. 12/286,644 (filed Sep. 30, 2008) (disclosing "Passive Preload and Capstan Drive for Surgical Instruments"), which are incorporated by reference herein in their entireties.

Flexible body 216 may also house cables, linkages, or other steering controls (not shown) that extend between drive unit 204 and distal end 218 to controllably bend distal end 218 as shown, for example, by broken dashed line depictions 219 of distal end 218. In some examples, at least four cables are used to provide independent "up-down" steering to control a pitch of distal end 218 and "left-right" steering to control a yaw of distal end 281. Steerable elongate devices are described in detail in U.S. patent application Ser. No. 13/274,208 (filed Oct. 14, 2011) (disclosing "Catheter with Removable Vision Probe"), which is incorporated by reference herein in its entirety. In embodiments in which medical instrument system 200 is actuated by a teleoperational assembly, drive unit 204 may include drive inputs that removably couple to and receive power from drive elements, such as actuators, of the teleoperational assembly. In some embodiments, medical instrument system 200 may include gripping features, manual actuators, or other components for manually controlling the motion of medical instrument system 200. Elongate device 202 may be steerable or, alternatively, the system may be non-steerable with no integrated mechanism for operator control of the bending of distal end 218. In some examples, one or more lumens, through which medical instruments can be deployed and used at a target surgical location, are defined in the walls of flexible body 216.

In some embodiments, medical instrument system 200 may include a flexible bronchial instrument, such as a bronchoscope or bronchial catheter, for use in examination, diagnosis, biopsy, or treatment of a lung. Medical instrument system 200 is also suited for navigation and treatment of other tissues, via natural or surgically created connected passageways, in any of a variety of anatomic systems, including the colon, the intestines, the kidneys and kidney calices, the brain, the heart, the circulatory system including vasculature, and/or the like.

The information from tracking system 230 may be sent to a navigation system 232 where it is combined with information from visualization system 231 and/or the preoperatively obtained models to provide the physician or other operator with real-time position information. In some examples, the real-time position information may be displayed on display system 110 of FIG. 1 for use in the control of medical instrument system 200. In some examples, control system 112 of FIG. 1 may utilize the position information as feedback for positioning medical instrument system 200. Various systems for using fiber optic sensors to register and display a surgical instrument with surgical images are provided in PCT Publication WO 2016/191298 (published Dec. 1, 2016) (disclosing "Systems and Methods of Registration for Image Guided. Surgery"), which is incorporated by reference herein in its entirety.

In some examples, medical instrument system 200 may be teleoperated within medical system 100 of FIG. 1. In some embodiments, manipulator assembly 102 of FIG. 1 may be replaced by direct operator control. In some examples, the direct operator control may include various handles and operator interfaces for hand-held operation of the instrument.

Figure 3A:
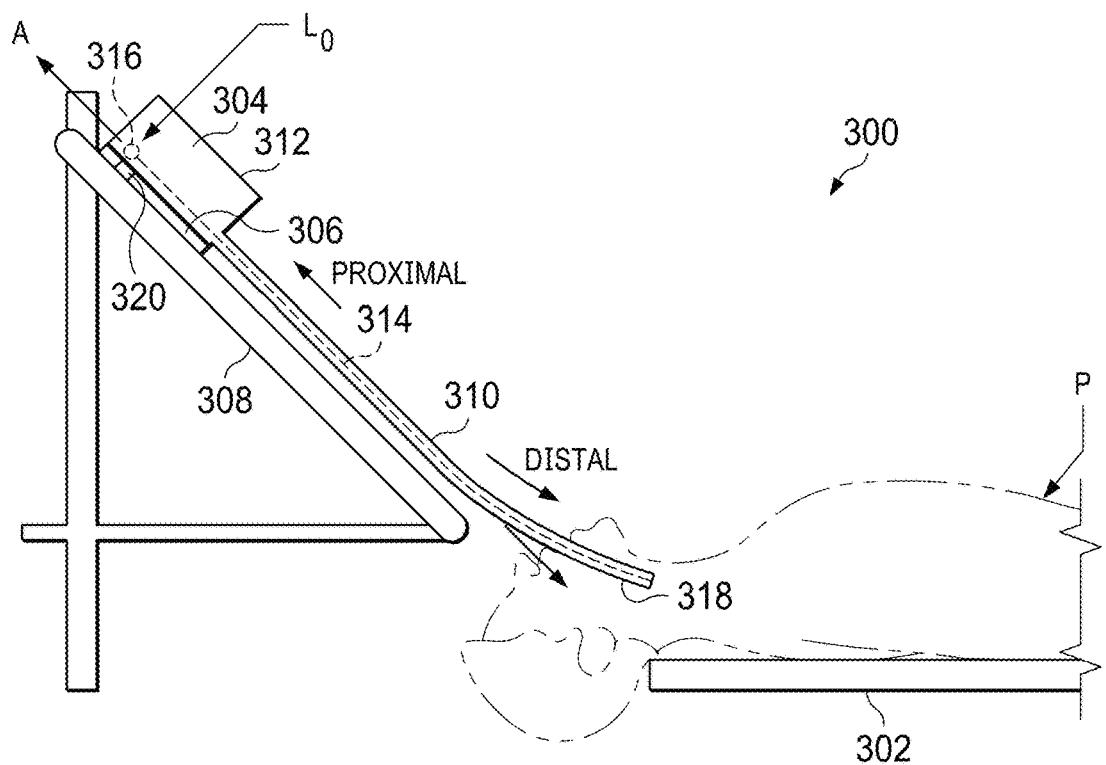
FIGS. 3A and 3B are simplified diagrams of side views of a patient coordinate space including a medical instrument mounted on an insertion assembly according to some embodiments.
Figure 3B:
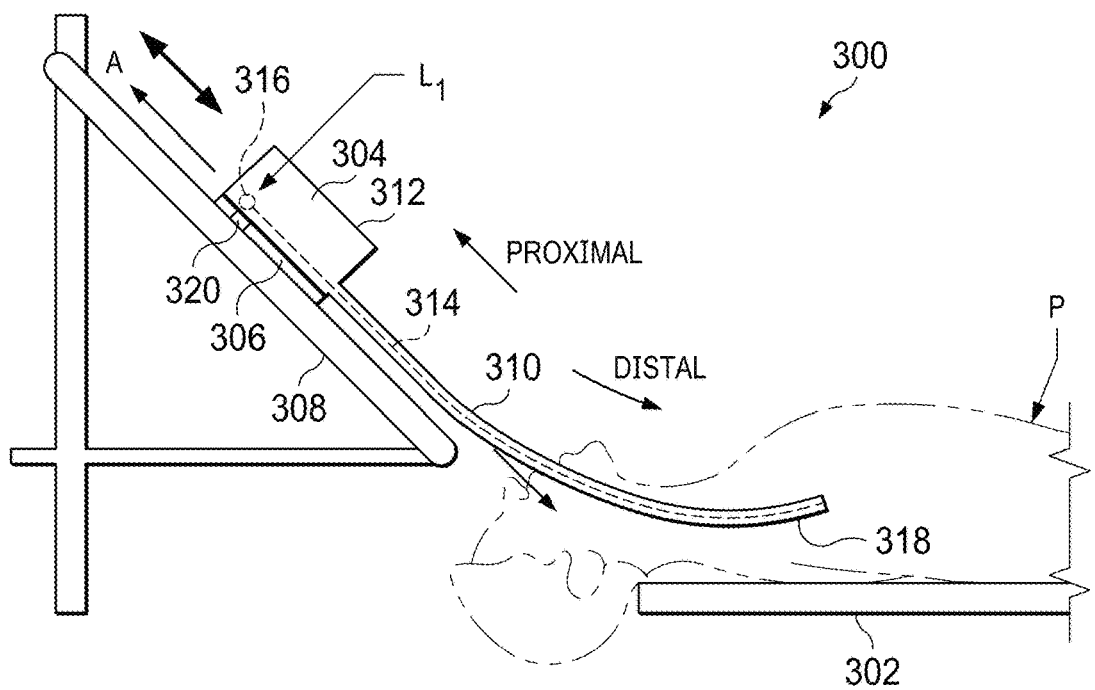

FIGS. 3A and 3B are simplified diagrams of side views of a patient coordinate space including a medical instrument mounted on an insertion assembly according to some embodiments. As shown in FIGS. 3A and 3B, a surgical environment 300 includes a patient P is positioned on the table T of FIG. 1. Patient P may be stationary within the surgical environment in the sense that gross patient movement is limited by sedation, restraint, and/or other means. Cyclic anatomic motion including respiration and cardiac motion of patient P may continue, unless patient is asked to hold his or her breath to temporarily suspend respiratory motion. Accordingly, in some embodiments, data may be gathered at a specific, phase in respiration, and tagged and identified with that phase. In some embodiments, the phase during which data is collected may be inferred from physiological information collected from patient P. Within surgical environment 300, a point gathering instrument 304 is coupled to an instrument carriage 306. In some embodiments, point gathering instrument 304 may use EM sensors, shape-sensors, and/or other sensor modalities. Instrument carriage 306 is mounted to an insertion stage 308 fixed within surgical environment 300. Alternatively, insertion stage 308 may be movable but have a known location (e.g., via a tracking sensor or other tracking device) within surgical environment 300. Instrument carriage 306 may be a component of a manipulator assembly (e.g., manipulator assembly 102) that couples to point gathering instrument 304 to control insertion motion (i.e., motion along the A axis) and, optionally, motion of a distal end 318 of an elongate device 310 in multiple directions including yaw, pitch, and roll. Instrument carriage 306 or insertion stage 308 may include actuators, such as servomotors, (not shown) that control motion of instrument carriage 306 along insertion stage 308.

Elongate device 310 is coupled to an instrument body 312. Instrument body 312 is coupled and fixed relative to instrument carriage 306. In some embodiments, an optical fiber shape sensor 314 is fixed at a proximal point 316 on instrument body 312. In some embodiments, proximal point 316 of optical fiber shape sensor 314 may be movable along with instrument body 312 but the location of proximal point 316 may be known (e.g., via a tracking sensor or other tracking device). Shape sensor 314 measures a shape from proximal point 316 to another point such as distal end 318 of elongate device 310. Point gathering instrument 304 may be substantially similar to medical instrument system 200.

A position measuring device 320 provides information about the position of instrument body 312 as it moves on insertion stage 308 along an insertion axis A. Position measuring device 320 may include resolvers, encoders, potentiometers, and/or other sensors that determine the rotation and/or orientation of the actuators controlling the motion of instrument carriage 306 and consequently the motion of instrument body 312. In some embodiments, insertion stage 308 is linear. In some embodiments, insertion stage 308 may be curved or have a combination of curved and linear sections, FIG. 3A shows instrument body 312 and instrument carriage 306 in a retracted position along insertion stage 308. In this retracted position, proximal point 316 is at a position $L_0$ on axis A. In this position along insertion stage 308 an A component of the location of proximal point 316 may be set to a zero and/or another reference value to provide a base reference to describe the position of instrument carriage 306, and thus proximal point 316, on insertion stage 308. With this retracted position of instrument body 312 and instrument carriage 306, distal end 318 of elongate device 310 may be positioned just inside an entry orifice of patient P. Also in this position, position measuring device 320 may be set to a zero and/or the another reference value (e.g., I=0). In FIG. 3B, instrument body 312 and instrument carriage 306 have advanced along the linear track of insertion stage 308 and distal end 318 of elongate device 310 has advanced into patient P. In this advanced position, the proximal point 316 is at a position $L_1$ on the axis A. In some examples, encoder and/or other position data from one or more actuators controlling movement of instrument carriage 306 along insertion stage 308 and/or one or more position sensors associated with instrument carriage 306 and/or insertion stage 308 is used to determine the position $L_x$ of proximal point 316 relative to position $L_0$. In some examples, position $L_x$ may further be used as an indicator of the distance or insertion depth to which distal end 318 of elongate device 310 is inserted into the passageways of the anatomy of patient P.

As described above, the virtual visualization system processes preoperative or intra-operative images of the surgical site using software to convert the recorded images into an anatomical image data set and then into a segmented two dimensional or three dimensional composite representations of a partial or an entire anatomic organ or anatomic region. The composite representation and the image data set describe the various locations and shapes of the passageways and their connectivity. The anatomical image data set may be segmented to produce graphical units (e.g., pixels or voxels), and model-based or machine learning techniques may be used to generate a probability map for the graphical units. The probability map associates a probability value with each graphical unit. The probability value may correspond to a type of anatomical tissue or structure. If, for example, the anatomic structure is a lung, the probability value may correspond to soft tissue or to airways. Often, the probability map provides rudimentary information that may not be sufficient to generate an accurate model of branched anatomical passageways, particularly when the anatomical image data set is noisy inherent electronic noise, artifacts, or physical anomalies) or the passageways are very small. Thus, the probability map alone may be insufficient to generate anatomical tree models that can be used in clinical applications. In the example of the lung, a probability map may provide a false positive probability value for a graphical unit which may cause the graphical unit to be misclassified as an airway. Alternatively, the probability map may provide a false negative probability value for a graphical unit which may cause the graphical unit to be misclassified as not part of an airway. The systems and methods described below may be used to generate more accurate anatomical tree models (also referred to as anatomical branch models).

Figure 4:
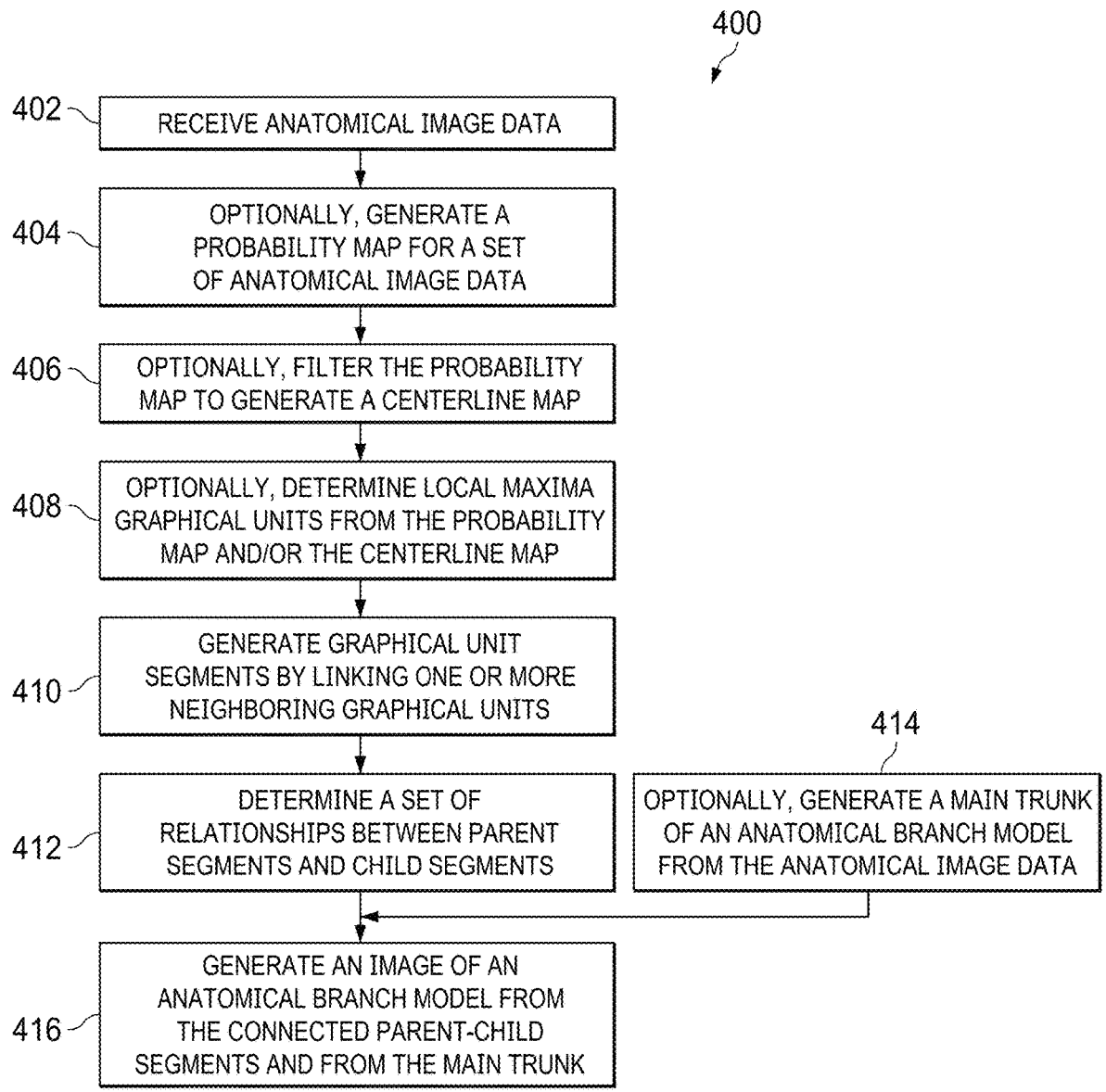
FIG. 4 illustrates a method for generating an image of an anatomical branch model from anatomical image data.

FIG. 4 illustrates a method for generating an image of an anatomical branch model from anatomical image data. The method 400 is illustrated as a set of operations or processes 402 through 416 and is described with continuing reference to FIGS. 6-12. Not all of the illustrated processes 402 through 416 may be performed in all embodiments of method 400. Additionally, one or more processes that are not expressly illustrated in FIG. 4 may be included before, after, in between, or as part of the processes 402 through 416. In some embodiments, one or more of the processes 402 through 416 may be implemented, at least in part, in the form of executable code stored on non-transitory, tangible, machine-readable media comprising a plurality of machine readable instructions that when executed by one or more processors (e.g., the processors of control system 112) may cause the one or more processors to perform one or more of the processes. In one or more embodiments, the processes 402 through 416 may be performed by the control system 112.

At a process 402, anatomical image data is received. The anatomical image data may be digital image data including a plurality of graphical units and may be recorded pre-operatively or intra-operatively using imaging technology such as CT, MRI, fluoroscopy, and/or the like. The pre-operative or intra-operative image data may be used to generate two-dimensional, three-dimensional, or four-dimensional (including e.g., time based or velocity based information) images. The anatomical image data may be received at the control system 112 or at another processor used to perform graphical segmentation with the image data.

Figure 6:
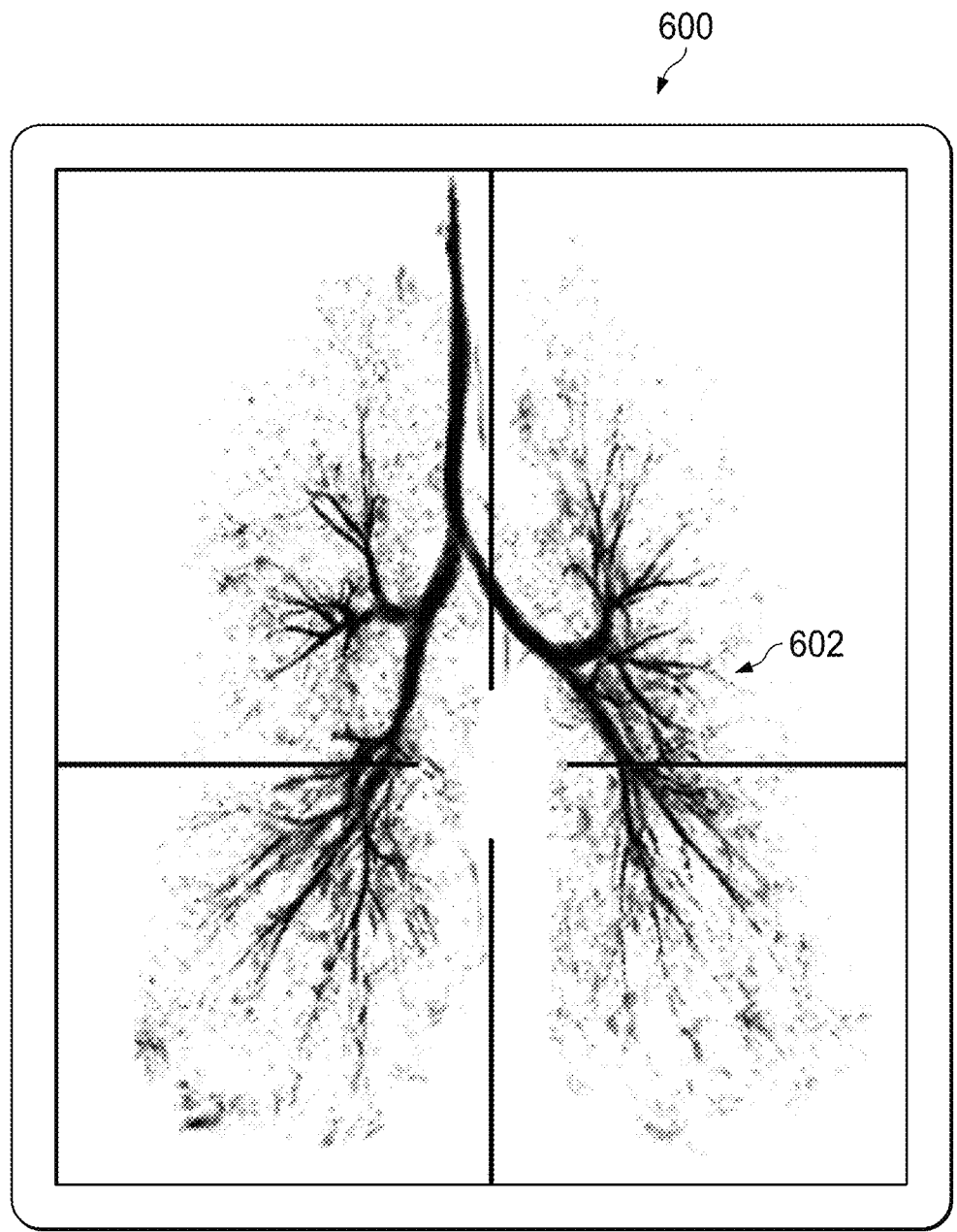
FIG. 6 illustrates a display including a probability map for a set of anatomical image data.

At an optional process 404, a probability map for the set of anatomical image data is generated. The probability map may be generated using an image segmentation algorithm that partitions the digital image data into graphical units (such as pixels or voxels) and assigns to each graphical unit a probability that the graphical unit shares certain characteristics such as tissue type. If, for example, the anatomical image data is from an image of a patient lung, the probability map may be an airway probability map that identifies which graphical units are likely to be associated with airways in the lung. The probability map may be derived from, for example, a filter response (such as a tube filter response), the use of a classifier, or semantic segmentation using a convolutional neural network. With reference to FIG. 6, a display 600 (e.g., on a display system 110) generates a probability map 602 for a set of anatomical image data of a human lung. The probability map 602 is comprised of voxels that are characterized by an airway probability value that exceeds an airway mapping probability threshold.

Figure 7:
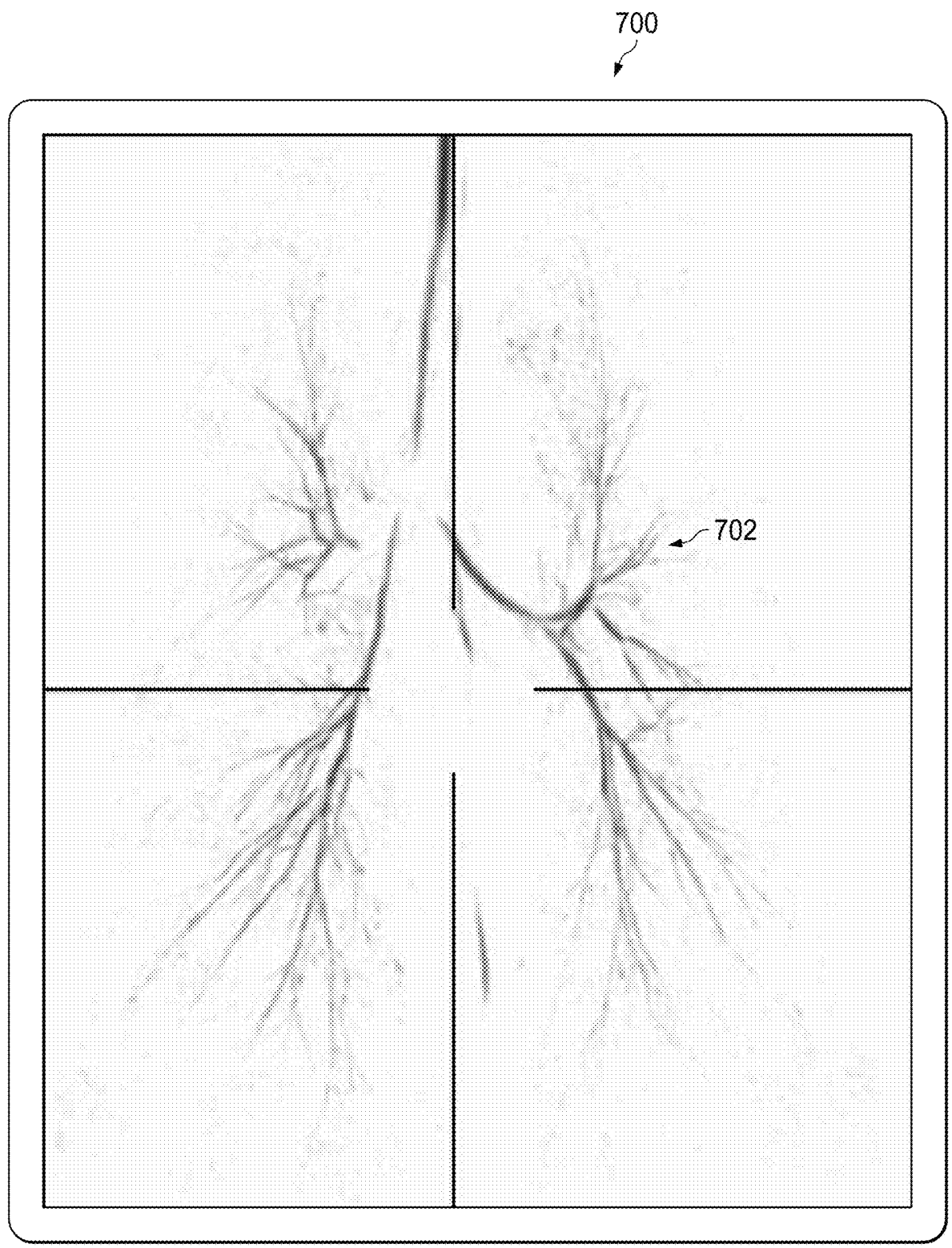
FIG. 7 illustrates a display including a filtered probability map for a set of anatomical image data.

At an optional process 406, a filter may be applied to the probability map to generate a centerline map through areas of the probability map. The filter may detect local curvatures, tube-like structures, or other features of the probability map and use the detected features to thin the probability map and generate a map of the centerlines through large branched areas of the probability map. For example, Hessian filters or structure tensor based filters may be used to generate centerlines through large (e.g. radially large and/or long) branches in an airway probability map. The filters may also provide additional information for each graphical unit (e.g., voxel) of the centerline map. For example, each graphical unit may be associated with a radial size of the airway in which the graphical unit is located or may be associated with the orientation of the airway in which the graphical unit is located. In some embodiments, the probability map itself may provide additional information such as the orientation associated with a graphical unit. Process 406 may be optional or limited in use to large airways. With reference to FIG. 7, a display 700 (e.g., on a display system 110) shows a centerline map 702 generated from the filtered probability map 602 of the human lung. The centerline map 702 is comprised of graphical units that correspond to the centerlines of some of the larger airways in the patient lung.

At an optional process 408, local maxima graphical units are determined from the probability map and/or the centerline map. The local maxima graphical units may be graphical units from the probability map and/or centerline map that have high probability values compared to neighboring graphical units. For example, if the graphical units are voxels, the probability value of each tested voxel may be compared to the six voxels immediately adjacent to the tested voxel. For larger airways, local maxima graphical units may be chosen from the graphical units comprising the centerline map. For smaller airways, local maxima graphical units may be chosen from the graphical units comprising the probability map. Whether an airway is classified as large or small may depend on the radius of the airway. For example, airways with a 5 mm or greater radius may be considered a large airway.

Figure 8:
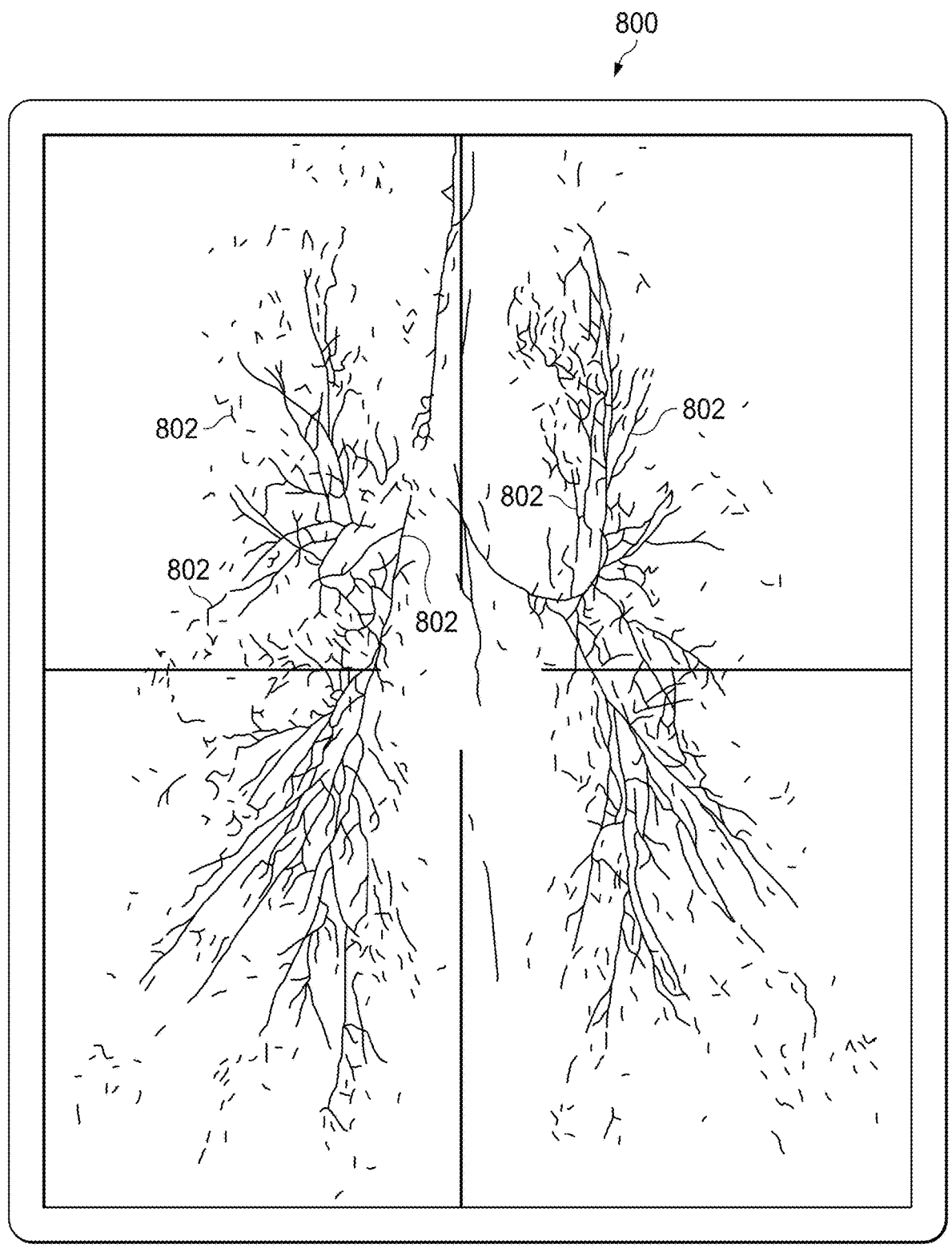
FIG. 8 illustrates a display including a plurality of graphical unit segments.

At a process 410, graphical unit segments, which may be determined to be parent or child segments are generated. In some embodiments, the graphical unit segments are generated by linking a local maxima graphical unit with one or more neighboring graphical units, Beginning with a local maxima graphical unit, the orientation value associated with the local maxima provides a traversal direction. The graphical units adjacent to the local maxima are traversed in the traversal direction and evaluated for connection to a graphical unit segment. If the traversed graphical unit exceeds a segment threshold value, the traversed graphical unit is connected to the local maximal graphical unit to form a graphical unit segment for the local maxima. The traversal and evaluation of the graphical units adjacent to the growing graphical unit segment continues until another local maxima graphical unit is encountered or until no neighboring graphical units exceed the segment threshold value. The process 410 may begin with any local maxima identified in the process 408. After the traversal process is completed with a first local maxima graphical unit, the process 410 may be repeated for all or a subset of the remaining local maxima graphical units until a plurality of discrete graphical unit segments are formed. With reference to FIG. 8, a display 800 (e.g., on a display system 110) shows a plurality of discrete graphical unit segments 802 generated by linking local maximal graphical units with neighboring graphical units.

Figure 5:
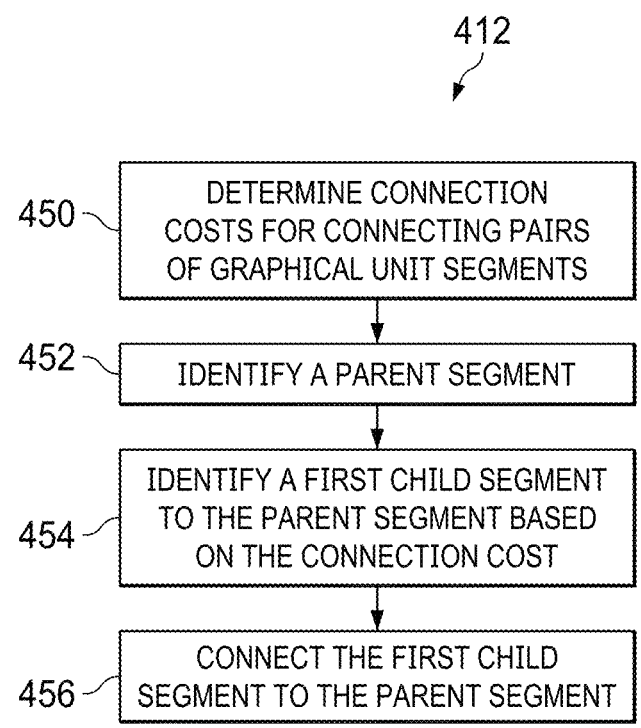
FIG. 5 illustrates a method for generating connected parent-child graphical unit segments.

At a process 412, a set of relationships is determined between graphical unit segments (e.g., graphical unit segments 802) based on parent-child affiliations. The process 412 is described in greater detail in FIG. 5. At a process 450, connection costs are calculated for connecting pairs of graphical unit segments. The connection cost between any two graphical unit segments may be based on connection factors or properties including, for instance, the distance between segments, the orientation of the segments or portions of the segments (e.g., comparing the angles between the two segments), and the radial thickness associated with a segment (e.g, an average of the radial thicknesses associated with graphical units in the segment or the radial thickness of the closest graphical units in the pair of segments). Weights may be applied to the connection properties to emphasize or deemphasize certain properties. Connection costs may be determined based on the closest graphical units within the pair of graphical segments, based on the graphical units at the ends of the segments, or based on other graphical unit comparisons between the pair of segments.

At a process 452, identify one or a small number (e.g., 3) of the graphical unit segments as parent segments. In some embodiments, the parent segment may be selected based on length and radial thickness. If, for example, the segments are generated from lung images, the parent segment (or root segment) may be a long graphical unit segment with a large radial thickness that corresponds to the trachea or the main bronchi.

At a process 454, a first child segment to the parent segment is identified based on the set of comparison costs for the identified parent segment, as determined in process 450. The first child segment may be identified as the segment have the lowest connection cost to the parent segment, thus identifying it as having the greatest likelihood of being the segment that should be connected to the parent segment to accurately model the actual patient anatomy.

Figure 9:
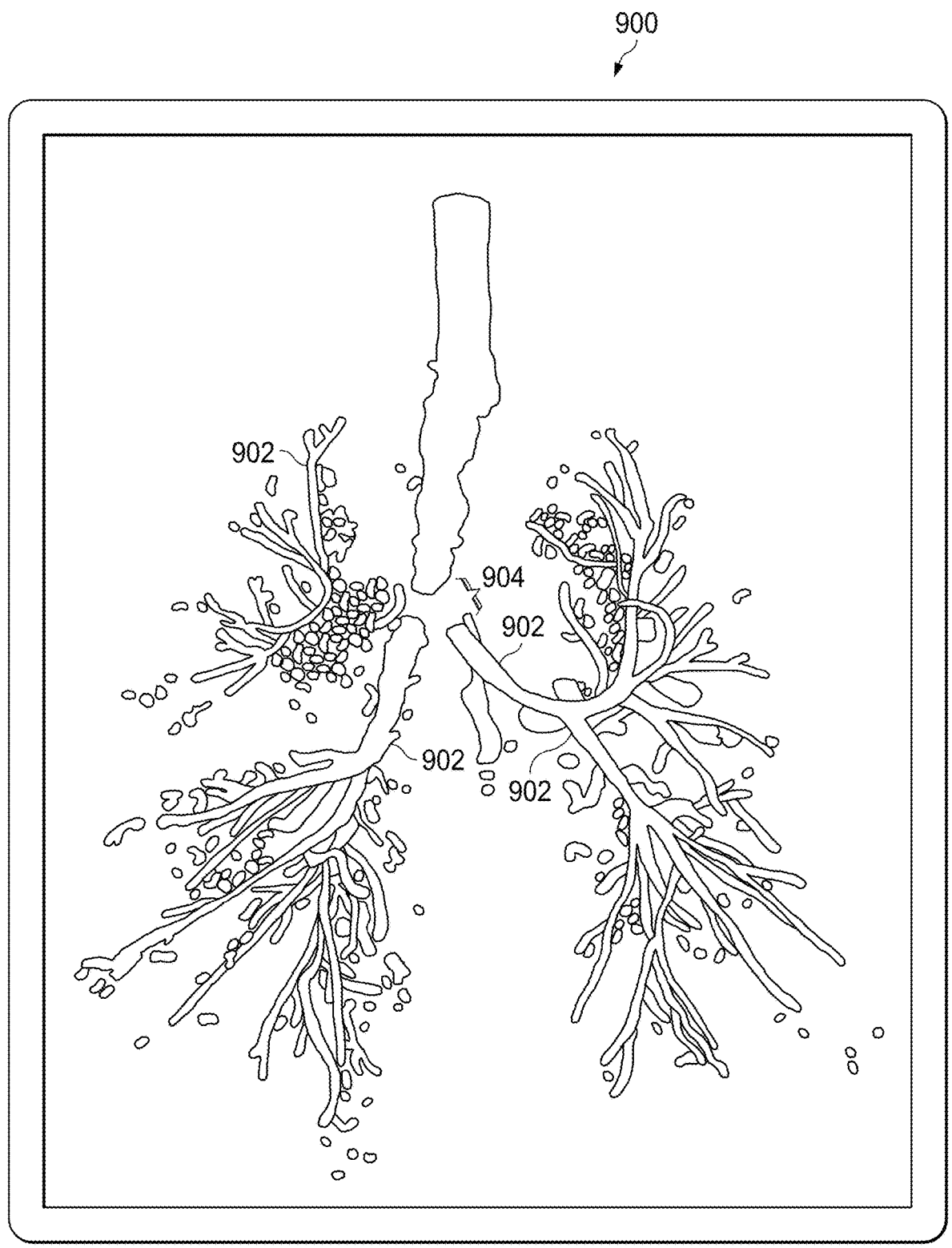
FIG. 9 illustrates a display including a plurality of connected graphical unit segments.
Figure 10:
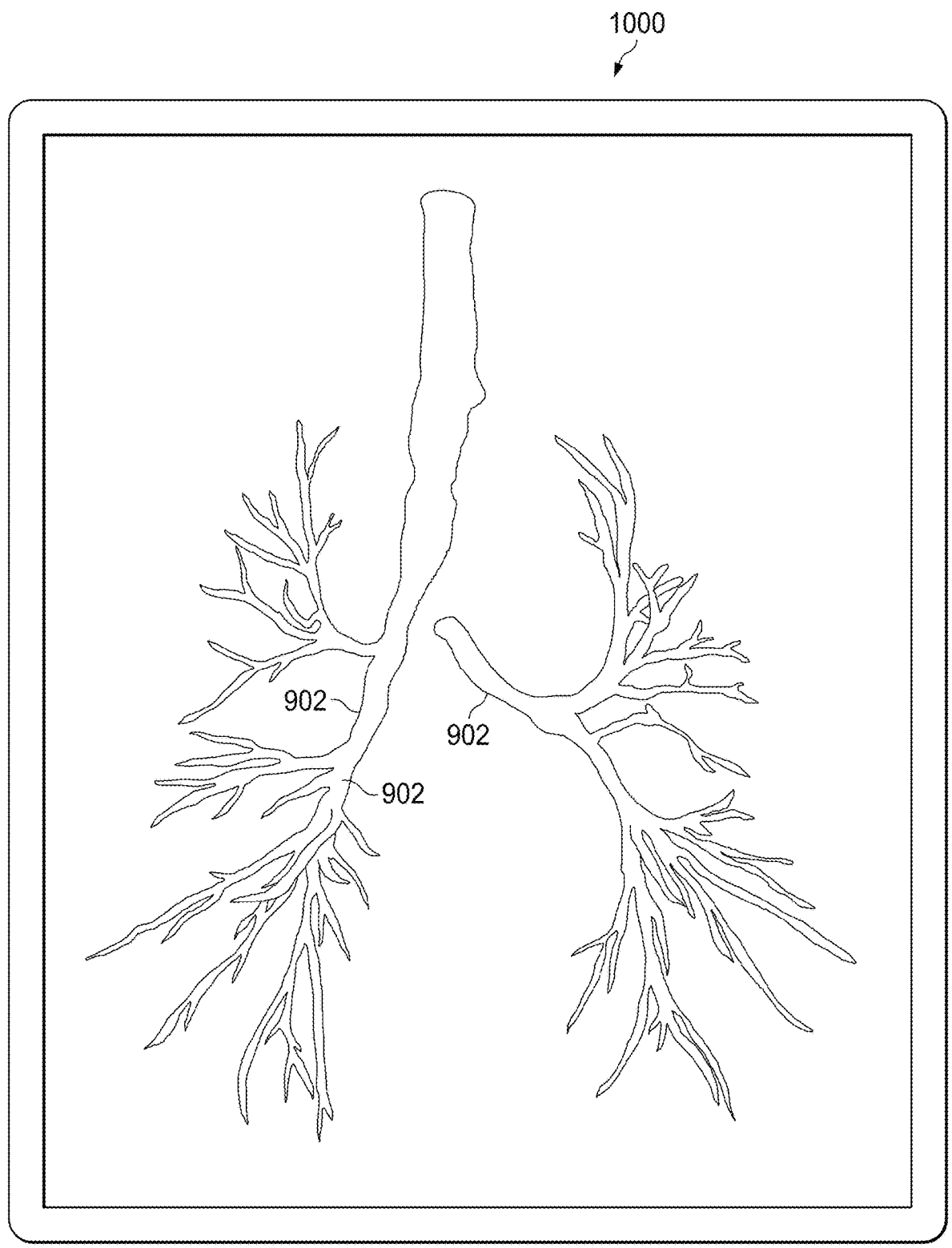
FIG. 10 illustrates a display including a pruned plurality of connected graphical unit segments.

At a process 456, the identified first child segment is connected to the parent segment. The processes 452-456 may be repeated with the first child segment now as the parent segment. The first child segment is connected to a next generation segment based on the computed connection cost. The connected generations of segments form branches, also referred to as segment sections. The processes may also be repeated for additionally identified parent segments. The processes repeat for successive generations until no segments remain to be connected to the branches. After the branches are generated from connected segments, the area around the branches may be segmented to grow the branches from the linear segments. Graph-based methods may be used to perform the segmentation. The thickness of the branches may be grown, for example, based on the radius and/or orientation associated with the graphical units in the connected segments. With reference to FIG. 9, a display 900 (e.g., on a display system 110) shows a plurality of branches 902 formed from by connecting the segments 802. The branches 902 have been grown radially from linear segments to more accurately model the patient anatomy. The branches 902 may not all be connected to each other due to a plurality of identified parent segments. In other words, gaps 904 may exist between branches formed by the processes 452-456. With reference to FIG. 10, a display 1000 (e.g., on a display system 110) shows a pruned subset of branches 902. The pruned subset is generated by further evaluating the benefits and costs for the branches and reducing the number of branches in the display. For example, the pruned subset may be generated by evaluating connections costs as described at process 450 and may include the evaluation of additional costs based on the characteristics of a branch and its descendants as a whole, including the total number of branches and/or over all orientation.

Figure 11:
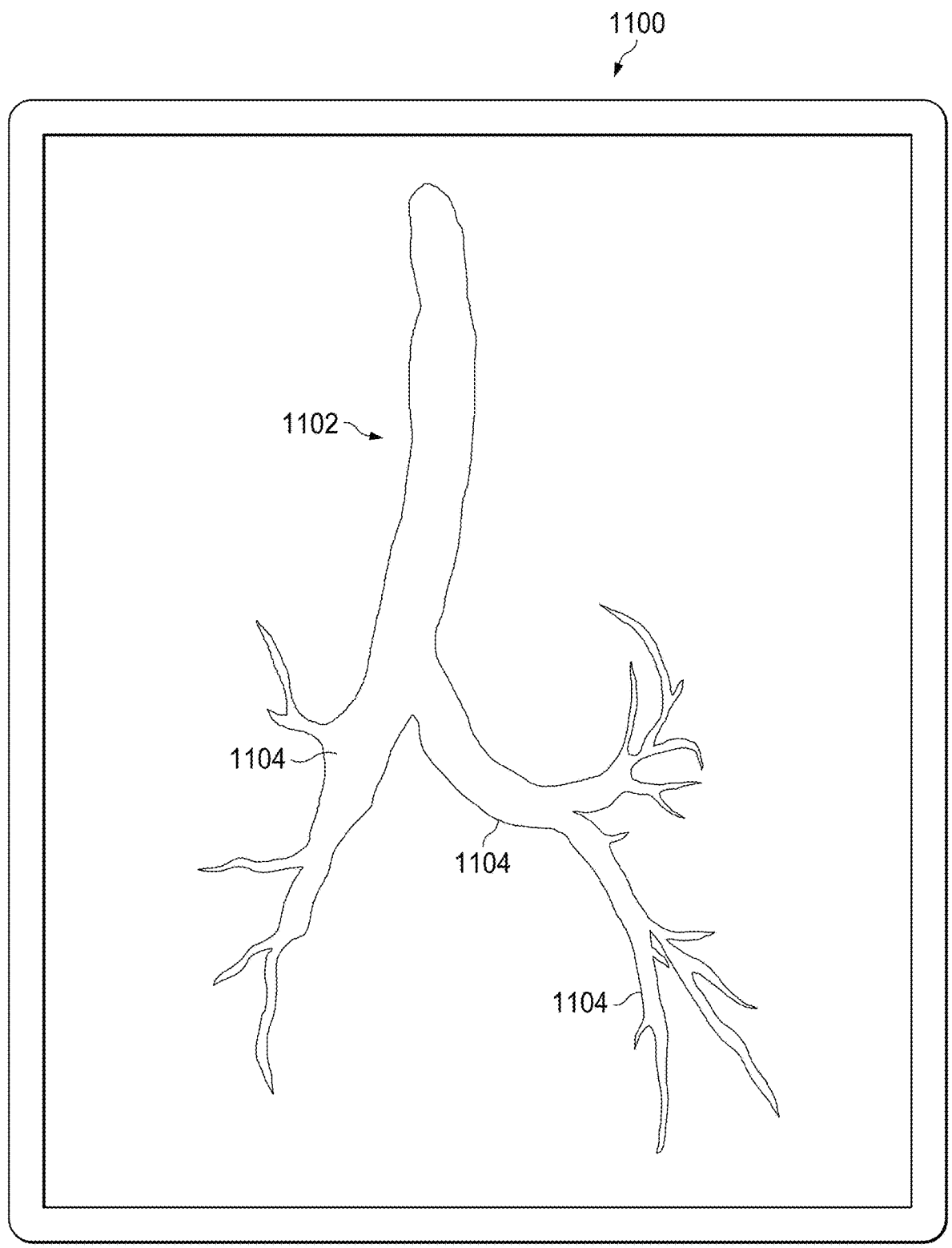
FIG. 11 illustrates a display including a main trunk model generated from anatomical image data.

Referring again to FIG. 4, a process 414 for growing a main trunk model of an anatomical branch model from the anatomical image data may be performed. Temporally, the process 414 may be performed any time after the anatomical image data is collected and before the anatomical branch model is completed at a process 416. The process 414 includes growing the main trunk model by applying the image segmentation algorithm to partition the digital image data. The segmentation may be generated from an initial graphical unit (e.g., a voxel) from the image data or in the probability map. In various examples, the chosen initial graphical unit may be a voxel associated with the trachea in a set of lung image data. The trachea voxel provides a seed to the segmentation algorithm which then evaluates neighboring voxels against a threshold value to determine whether the neighboring voxels should be included in the main trunk model. In various examples, the trachea voxel may have a Hounsfield value greater than −500 HU. Neighboring voxels to the trachea voxel may be added to the main trunk model if they are less than a threshold of, for example −500 HU. In the example of the lung image data, the threshold value may be set so that the main trunk model captures only the trachea, the main bronchi, and potentially other relatively large airways. With reference to FIG. 11, a display 1100 (e.g., on a display system 110) shows a main trunk model 1102 with a plurality of branches 1104 formed from the segmentation of the image data. The branches 1104 in the main trunk model 1102 may be coupled to the main trunk model, with no orphan branches.

In one example embodiment, growing a main trunk model of an anatomical branch model includes smoothing the anatomical image data to reduce noise. An initial graphical unit (i.e., a seed) from the smoothed anatomical image data may be grown by gradually increasing the threshold from the lowest value in the image up to a threshold of approximately 500 HU. The growing process may be stopped if no more neighboring voxels with values less than the threshold exist and the maximum threshold of −500 HU has been reached. The growing process may also be stopped if the distance from the seed voxel to the current accepted voxel exceeds a certain distance (e.g., 1000 mm). The growing process may also be stopped if the total volume of grown voxels exceeds a threshold value such as approximately 57,000 cu. mm.

Figure 12:
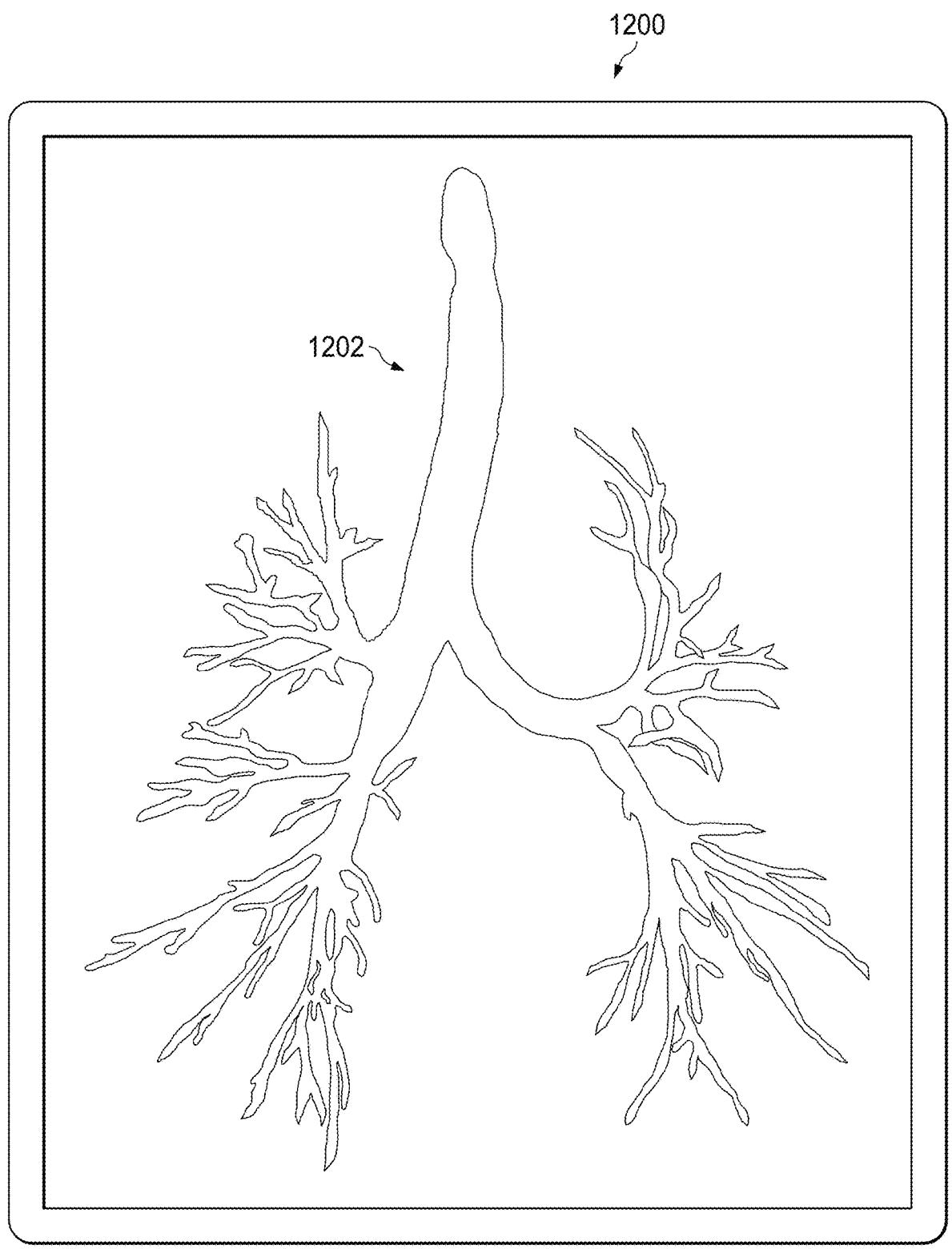
FIG. 12 illustrates a display including an anatomical branch model.

At a process 416, an image of an anatomical branch model is generated from the branches of connected parent-child segments and, optionally, from the main trunk model. Combining the main trunk model with the branches may generate a unified model in which all branches are connected. With reference to FIG. 12; a display 1200 (e.g.; on a display system 110) shows the anatomical branch model 1202 which is generated by combining the main trunk model 1102 with the branches 902. The anatomical branch model 1202 may be used to perform virtual navigation procedures and to treat the modeled anatomy.

One or more elements in embodiments of this disclosure may be implemented in software to execute on a processor of a computer system such as control processing system. When implemented in software, the elements of the embodiments of the invention are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet; etc.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A method of building an anatomical branch model comprising:

receiving anatomical image data comprising a plurality of graphical units associated with an anatomical structure;

determining a plurality of parent segments and child segments to include a plurality of linked graphical units from the plurality of graphical units of the anatomical image data;

determining a set of relationships between the parent segments and the child segments, including determining, for at least one of the parent segments, a first set of connection costs of connecting the at least one parent segment to a first subset of the child segments, wherein the child segments of the first subset of child segments are separated from the at least one of the parent segments by one or more gaps;

identifying a first child segment from the first subset of the child segments based on a first connection cost of the first set of connection costs, the first connection cost being associated with the first child segment, being less than at least a second connection cost associated with a second child segment of the first subset of child segments; and connecting after the identifying, the first child segment to the at least one parent segment to form a segment section; and generating an image of the anatomical branch model based on the determined set of relationships between the parent segments and the child segments, including the segment section connecting the first child segment and the at least one parent segment.

2. The method of claim 1 wherein the first set of connection costs is determined based on a plurality of properties of the linked graphical units in the at least one parent segment and the first subset of child segments.

3. The method of claim 2, wherein the first set of connection costs is determined by applying weights to the plurality of properties of the linked graphical units.

4. The method of claim 2 wherein a given connection cost of the first set of connection costs is determined based on the properties that include a distance between a linked graphical unit in the at least one parent segment and a linked graphical unit in a given one of the first subset of the child segments.

5. A system for building an anatomical branch model comprising:
a display system; and
a control system communicatively coupled to the display system, wherein the control system is configured to:
receive anatomical image data comprising a plurality of graphical units associated with an anatomical structure;
determine a plurality of parent segments and child segments to include a plurality of linked graphical units from the plurality of graphical units of the anatomical image data;
determine a set of relationships between the parent segments and the child segments, including
determining, for at least one of the parent segments, a first set of connection costs of connecting the at least one parent segment to a first subset of the child segments, wherein the child segments of the first subset of child segments are separated from the at least one of the parent segments by one or more gaps;
identifying a first child segment from the first subset of the child segments based on a first connection cost of the first set of connection costs, the first connection cost being associated with the first child segment, being less than at least a second connection cost associated with a second child segment of the first subset of child segments; and
connecting, after the identifying, the first child segment to the at least one parent segment to form a segment section; and
generate an image of the anatomical branch model for display on the display system, wherein the generation of the image is based on the determined set of relationships between the parent segments and the child segments, including the segment section connecting the first child segment and the at least one parent segment.

6. The system of claim 5 wherein the first set of connection costs is determined based on a plurality of properties of the linked graphical units in the at least one parent segment and the first subset of child segments.

7. The system of claim 6, wherein the first set of connection costs is determined by applying weights to the plurality of properties of the linked graphical units.

8. The system of claim 6 wherein a given connection cost of the first set of connection costs is determined based on the properties that include a distance between a linked graphical unit in the at least one parent segment and a linked graphical unit in a given one of the first subset of the child segments.

9. The system of claim 6 wherein a given connection cost of the first set of connection costs is determined based on the properties that include an angle between a linked graphical unit in the at least one parent segment and a linked graphical unit in a given one of the first subset of the child segments.

10. The system of claim 6 wherein a given connection cost of the first set of connection costs is determined based on the properties that include a radius differential between a linked graphical unit in the at least one parent segment and a linked graphical unit in a given one of the first subset of the child segments.

11. The system of claim 5 wherein determining the parent segments further comprises:
identifying the parent segments based on a radial size.

12. The system of claim 5 wherein determining the parent segments further comprises:
identifying the parent segments based on a length dimension.

13. The system of claim 5 wherein determining the set of relationships between the parent segments and the child segments further comprises:
determining a second set of connection costs of connecting the first child segment to a second subset of the child segments;
identifying a second child segment from the second subset of the child segments based on the second set of connection costs; and
connecting the second child segment to the segment section,
wherein the generated image of the anatomical branch model includes the second child segment connected to the segment section.

14. The system of claim 5 wherein determining the child segments further comprises:
linking a local maxima graphical unit to a neighboring graphical unit, wherein the local maxima graphical unit has a probability value greater than the neighboring graphical unit and wherein a probability value of the neighboring graphical unit exceeds a probability threshold.

15. The system of claim 14, wherein an orientation of the local maxima graphical unit matches an orientation of the neighboring graphical unit.

16. The system of claim 14 further comprising:
identifying the local maxima graphical unit from the plurality of graphical units of the anatomical image data represented in a probability map.

17. The system of claim 14 further comprising:
applying a filter to a probability map of the anatomical image data to generate a centerline map comprising the plurality of graphical units; and
identifying the local maxima graphical unit from the plurality of graphical units of the centerline map.

18. The system of claim 17 further comprising:
applying the filter to the probability map of the anatomical image data to generate an orientation value for the plurality of graphical units in the centerline map.

19. The system of claim 5 wherein generating the image of the anatomical branch model includes radially expanding the segment section.

20. The system of claim 19 further comprising:
generating a main trunk of the anatomical branch model from the anatomical image data and wherein generating the image of the anatomical branch model includes combining the main trunk with the radially expanded segment section.

* * * * *